US009194308B2

(12) United States Patent
Iwata et al.

(10) Patent No.: US 9,194,308 B2
(45) Date of Patent: Nov. 24, 2015

(54) CONTROL APPARATUS FOR INTERNAL COMBUSTION ENGINE EQUIPPED WITH TURBOCHARGER

(75) Inventors: Akitoshi Iwata, Susono (JP); Masakazu Tabata, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 100 days.

(21) Appl. No.: 13/576,896

(22) PCT Filed: Mar. 3, 2010

(86) PCT No.: PCT/JP2010/053467
§ 371 (c)(1),
(2), (4) Date: Aug. 2, 2012

(87) PCT Pub. No.: WO2011/108092
PCT Pub. Date: Sep. 9, 2011

(65) Prior Publication Data
US 2012/0304641 A1    Dec. 6, 2012

(51) Int. Cl.
*F02D 23/00*    (2006.01)
*F02B 37/24*    (2006.01)
(Continued)

(52) U.S. Cl.
CPC .............. *F02D 23/00* (2013.01); *F02B 37/24* (2013.01); *F02D 21/08* (2013.01);
(Continued)

(58) Field of Classification Search
CPC . F02B 37/24; F02D 21/08; F02D 2200/0802; F02D 23/00; F02D 41/0007; F02D 41/0065; F02D 41/024; F02D 41/029; F02M 25/0707; F02M 25/074; F04D 29/462; Y02T 10/144

USPC ......... 60/602, 287, 297, 605.2, 599; 123/672, 123/562
See application file for complete search history.

(56) References Cited

U.S. PATENT DOCUMENTS 5,059,097 A    10/1991  Okazaki et al.
5,067,320 A *  11/1991  Kanesaki ...................... 60/297
(Continued)

FOREIGN PATENT DOCUMENTS

EP    0 034 915 A1    9/1981
EP    2184463 A1     5/2010
(Continued)

OTHER PUBLICATIONS

English Machine Translation of JP 2008-128043 A.*
(Continued)

*Primary Examiner* — Mary A Davis
*Assistant Examiner* — Paul Thiede
(74) *Attorney, Agent, or Firm* — Kenyon & Kenyon LLP

(57) ABSTRACT

A control apparatus is applied to an internal combustion engine. The internal combustion engine includes a turbocharger; an exhaust gas purifying catalyst which is arranged at a section downstream of a turbine in the exhaust passage; and a low pressure EGR passage which connects a section downstream of the exhaust gas purifying device in the exhaust passage and a section upstream of a compressor in the intake passage. The compressor is provided with a movable vane mechanism capable of varying throttled quantity of a flow passage of intake gas by moving diffuser vanes. The control apparatus controls the movable vane mechanism so that the throttled quantity of the flow passage is decreased when the exhaust gas is led to the compressor via the low pressure EGR passage as compared with a case when the exhaust gas is not led to the compressor.

6 Claims, 9 Drawing Sheets

(51) Int. Cl.
  *F02D 21/08* (2006.01)
  *F02D 41/00* (2006.01)
  *F02D 41/02* (2006.01)
  *F02M 25/07* (2006.01)
  *F04D 29/46* (2006.01)

(52) U.S. Cl.
  CPC ......... *F02D 41/0007* (2013.01); *F02D 41/029* (2013.01); *F04D 29/462* (2013.01); *F02D 41/0065* (2013.01); *F02D 41/024* (2013.01); *F02D 2200/0802* (2013.01); *F02M 25/074* (2013.01); *F02M 25/0707* (2013.01); *Y02T 10/144* (2013.01)

(56) References Cited

U.S. PATENT DOCUMENTS

| | | | |
|---|---|---|---|
| 6,899,090 | B2 | 5/2005 | Arnold |
| 8,287,232 | B2 | 10/2012 | Gu et al. |
| 2006/0112690 | A1* | 6/2006 | Hemer ............................ 60/602 |
| 2006/0249129 | A1* | 11/2006 | Ozdemir ....................... 123/672 |
| 2007/0144172 | A1 | 6/2007 | Sumser et al. |
| 2007/0266705 | A1* | 11/2007 | Wood et al. ..................... 60/599 |
| 2008/0006024 | A1 | 1/2008 | Tahara et al. |
| 2008/0011278 | A1* | 1/2008 | Yamagata ...................... 123/562 |
| 2009/0084087 | A1* | 4/2009 | Odajima et al. ................ 60/287 |

FOREIGN PATENT DOCUMENTS

| | | | |
|---|---|---|---|
| JP | 54-020213 A | | 2/1979 |
| JP | 56-129705 A | | 10/1981 |
| JP | 06323147 A | | 11/1994 |
| JP | 11132050 A | | 5/1999 |
| JP | 2001-329996 A | | 11/2001 |
| JP | 2005214095 A | | 8/2005 |
| JP | 2006188989 A | | 7/2006 |
| JP | 2007-132232 A | | 5/2007 |
| JP | 2007154675 A | | 6/2007 |
| JP | 2007-262971 A | | 10/2007 |
| JP | 2007285222 A | * | 11/2007 |
| JP | 2007-332945 A | | 12/2007 |
| JP | 2008-128043 A | | 6/2008 |
| JP | 2008255903 A | | 10/2008 |
| JP | 2009062851 A | | 3/2009 |
| JP | 2009-209816 A | | 9/2009 |
| WO | 2005121559 A1 | | 12/2005 |
| WO | 2007089737 A1 | | 8/2007 |

OTHER PUBLICATIONS

English Machine Translation of JP 2007-262971 A.*
International Search Report mailed Apr. 27, 2010 of PCT/JP2010/053467.
Japanese Patent Application No. 2011-516924, Decision to Grant a Patent dated Jun. 15, 2012 and English translation thereof.
Advisory Action dated Oct. 22, 2013 issued in U.S. Appl. No. 13/121,779.
Office Action dated Aug. 1, 2013, issued in U.S. Appl. No. 13/121,779.
Office Action dated Jan. 29, 2013, issued in U.S. Appl. No. 13/121,779.
Non-Final Office Action mailed Feb. 14, 2014, in U.S. Appl. No. 13/121,779.

* cited by examiner

CONTROL APPARATUS FOR INTERNAL COMBUSTION ENGINE EQUIPPED WITH TURBOCHARGER

This is a 371 national phase application of PCT/JP2010/053467 filed 03 Mar. 2010, the contents of which are incorporated herein by reference.

TECHNICAL FIELD

The present invention relates to a control apparatus for an internal combustion engine equipped with a turbocharger in which a compressor is provided with a movable vane.

BACKGROUND ART

There is known a turbocharger provided with a compressor in which a variable diffuser located between a compressor wheel and a scroll flow passage is provided with plural movable vanes and a cross-section area of the variable diffuser is changed by rotating the plural movable vanes (see patent literature 1). Furthermore, with respect to an internal combustion engine equipped with a turbocharger, there is known the internal combustion engine including an EGR passage for recirculating exhaust gas passed through a turbine and an exhaust gas purifying catalyst to an upper stream of a compressor (see patent literature 2). In addition, there are Patent Literatures 3-5 as prior art references in relation to the present invention.

CITATION LIST

Patent Literatures

Patent Literature 1: JP-A-2007-262971
Patent Literature 2: JP-A-2008-128043
Patent Literature 3: JP-A-2001-329996
Patent Literature 4: JP-A-2007-132232
Patent Literature 5: JP-A-2007-332945

SUMMARY OF INVENTION

Technical Problem

As well known, an exhaust gas purifying catalyst and a filter for purifying the exhaust gas may be broken by giving a shock. Furthermore, these become fragile when temperature of these is high to excess. When the exhaust gas purifying catalyst or the filter is broken in this manner, broken pieces of these are included in the exhaust gas as foreign matters. When a turbocharger such as shown in the Patent Literature 1 is applied to the internal combustion engine of the Patent Literature 2, the exhaust gas is recirculated to the upper stream of the compressor. Thereby, when the foreign matters are included in the exhaust gas, there is a possibility that the foreign matters collide with the movable vane and the movable vane is damaged.

In view of the foregoing, an object of the present invention is to provide a control apparatus for an internal combustion engine equipped with a turbocharger, which can suppress damaging a movable vane provided with a compressor.

Solution to Problem

A control apparatus applied to an internal combustion engine of the present invention includes a turbocharger having a turbine which is provided in an exhaust passage and a compressor which is provided in an intake passage; a exhaust gas purifying device which is arranged to purify exhaust gas at a section downstream of the turbine in the exhaust passage; and an EGR passage which connects a section downstream of the exhaust gas purifying device in the exhaust passage and a section upstream of the compressor in the intake passage, the compressor including: a flow passage being provided over the circumference of the compressor wheel and radially outward therefrom; and a movable vane mechanism, the movable vane mechanism including plural movable vanes being provided in the flow passage in such a way that the plural movable vanes are arranged in a circumference direction (CD in FIG. 3) of the compressor wheel at regular intervals; and shaft portions being provided to the movable vanes respectively, and the movable vane mechanism varying sizes of spaces between the movable vanes by rotating the plural movable vanes around the shaft portions by using an actuator wherein the control apparatus is programmed so as to include control programming instructions that are executed to control an operation of the movable vane mechanism so that the sizes of the spaces are increased when the exhaust gas is led to the compressor via the EGR passage as compared with a case when the exhaust gas is not led to the compressor while the internal combustion engine is operated.

According to the control apparatus of the present invention, since the throttled quantity of the flow passage by the movable vanes is decreased when the exhaust gas is led to the compressor via the EGR passage, it is possible to suppress that foreign matters in the exhaust gas collide against the movable vanes. Furthermore, by decreasing the throttled quantity of the flow passage in this manner, it is possible to decrease flow velocity of the intake gas. Thereby, it is possible to suppress the foreign matters that collide against the movable vanes at high speed. Accordingly, it is possible to suppress the damage of the movable vane.

In one embodiment of the control apparatus of the present invention, the control programming instructions may be further executed by the control apparatus to control the operation of the movable vane mechanism so that the plural movable vanes are rotated to a position which makes the sizes of the spaces largest within range of positions where a surge of the compressor is avoided, when a temperature of the exhaust gas purifying device is equal to or higher than a predetermined upper limit temperature and the exhaust gas is led to the compressor via the EGR passage. As well known, the exhaust gas purifying device such as an exhaust gas purifying catalyst and a filter becomes fragile when it is overheated. In this embodiment, the movable vane is moved to the position where the throttled quantity of the flow passage is the smallest within positions where the surge of the compressor can be avoided, when the temperature of the exhaust gas purifying device is equal to or higher than the upper limit temperature and the exhaust gas is led to the compressor. Thereby, it is possible to suppress the foreign matters that collide against the movable vanes. Accordingly, it is possible to suppress the damage of the movable vane. Furthermore, by moving the movable vane to such position, it is possible to suppress the surge of the compressor.

In one embodiment of the control apparatus of the present invention, a performance of the exhaust gas purifying device may be recovered by an elevating temperature operation, the control apparatus may be further programmed so as to include control programming instructions that are executed to elevate the temperature of the exhaust gas purifying device up to a target temperature at a moment when the elevating temperature operation is performed, and the control programming instructions may be further executed by the control apparatus to control the operation of the movable vane mechanism so that the plural movable vane are rotated to a position which makes the sizes of the spaces largest within range of positions where a surge of the compressor is avoided, when the elevating temperature operation is performed by the control apparatus executing the control programming instructions and the exhaust gas is led to the compressor via the EGR passage. There is known a recoverable exhaust gas purifying device that particulate matters or sulfur oxides and like accumulated on the exhaust gas purifying device are dissolved and removed by the elevating temperature operation, and a purifying performance of the exhaust gas purifying device is recovered, as the exhaust gas purifying device. Since the matters accumulated on the exhaust gas purifying device are removed when the elevating temperature operation is performed for the exhaust gas purifying device, the foreign matters in the exhaust gas are increased at the downstream side of the exhaust gas purifying device. Thereby, when the exhaust gas is led to the compressor via the EGR passage, there is a possibility that an amount of the foreign matters flowing into the compressor is increased. In this embodiment, when the elevating temperature operation of the exhaust gas purifying device is performed and the exhaust gas is led to the compressor via the EGR passage, the throttled quantity of the flow passage is decreased. Thereby, it is possible to suppress the foreign matters that collide against the movable vanes. Accordingly, it is possible to suppress the damage of the movable vane. Furthermore, it is possible to suppress the surge of the compressor.

In one embodiment of the control apparatus of the present invention, the flow passage may be provided over a whole circumference outward radially of the compressor wheel, the flow passage may be provided with plural movable vanes in such a way that the plural movable vanes are arranged in a circumference direction at regular intervals, and the movable vane mechanism may vary the throttled quantity of the flow passage by varying sizes of spaces between the movable vanes by rotating the plural movable vanes around shaft portions, the shaft portions being provided to the movable vanes respectively. In the movable vane mechanism like this, by increasing the sizes of spaces between the movable vanes, the throttled quantity of the flow passage is decreased. Thereby, by decreasing the throttled quantity, it is hard that the foreign matters in the exhaust gas collide against the movable vanes. Accordingly, it is possible to suppress the damage of the movable vane.

In one embodiment of the control apparatus of the present invention, the movable vane may be provided so as to be movable between a projected position where the movable vane is projected into the flow passage and a housed position where the movable vane is housed within a wall surface forming the flow passage, and the control apparatus may be programmed so as to include control programming instructions that are executed to control the operation of the movable vane mechanism so that the movable vane is moved to the housed position when the exhaust gas is led to the compressor via the EGR passage. By moving the movable vane to the housed position in this manner, it is possible to suppress the foreign matters that collide against the movable vanes. Thereby, it is possible to suppress the damage of the movable vane.

In this embodiment, the control programming instructions may be further executed by the control apparatus to control the operation of the movable vane mechanism so that the movable vane is moved to the housed position when a temperature of the exhaust gas purifying device is equal to or higher than a predetermined upper limit temperature and the exhaust gas is led to the compressor via the EGR passage. As described above, the exhaust gas purifying device becomes fragile when it is overheated. Thereby, there is a possibility that the amount of the foreign matters in the exhaust gas is increased when the temperature of the exhaust gas purifying device is high. In this embodiment, when the temperature of the exhaust gas purifying device is equal to or higher than the upper limit temperature and the exhaust gas is led to the compressor, the movable vane is moved to the housed position. Thereby, it is possible to suppress the foreign matters that collide against the movable vanes. Accordingly, it is possible to suppress the damage of the movable vane.

Furthermore, a performance of the exhaust gas purifying device may be recovered by an elevating temperature operation, the control apparatus may be further programmed so as to include control programming instructions that are executed to elevate the temperature of the exhaust gas purifying device up to a target temperature at a moment when the elevating temperature operation is performed, and the control programming instructions may be further executed by the control apparatus to control the operation of the movable vane mechanism so that the movable vane is moved to the housed position when the elevating temperature operation is performed by the control apparatus executing the control programming instructions and the exhaust gas is led to the compressor via the EGR passage. By switching the position of the movable vane in this manner, it is possible to avoid the foreign matters that collide against the movable vane when the elevating temperature operation is performed for the exhaust gas purifying device and the foreign matters in the exhaust gas are increased. Thereby, it is possible to suppress the damage of the movable vane.

Furthermore, a performance of the exhaust gas purifying device may be recovered by an elevating temperature operation, the control apparatus may further comprises an elevating temperature device which elevates the temperature of the exhaust gas purifying device up to a target temperature at a moment when the elevating temperature operation is performed, and the control device may control the operation of the movable vane mechanism so that the movable vane is moved to the housed position when the elevating temperature operation is performed by the elevating temperature device and the exhaust gas is led to the compressor via the EGR passage. By switching the position of the movable vane in this manner, it is possible to avoid that the foreign matters collide against the movable vane when the elevating temperature operation is performed against the exhaust gas purifying device and the foreign matters in the exhaust gas are increased. Thereby, it is possible to suppress the damage of the movable vane.

DESCRIPTION OF EMBODIMENTS (First Embodiment)

Figure 1:
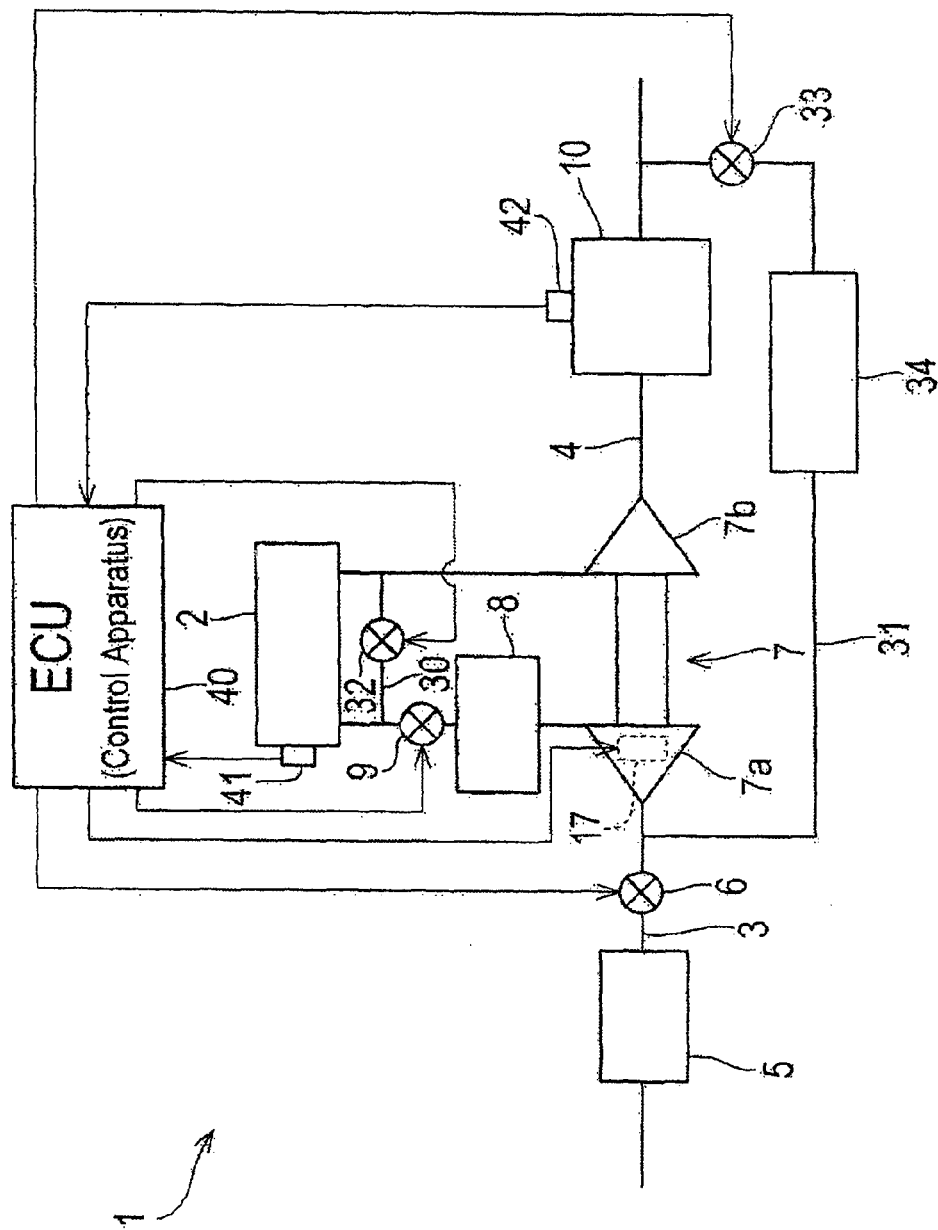
FIG. 1 is a view schematically showing an internal combustion engine incorporated with a control apparatus according to a first embodiment of the present invention.

FIG. 1 schematically shows an internal combustion engine in which a control apparatus according to a first embodiment of the present invention is incorporated. The internal combustion engine (hereinafter, referred to as an engine) 1 is an engine mounted on a vehicle as a traveling power source and includes an engine main body 2 having plural cylinders (not shown). An intake passage 3 and an exhaust passage 4 are connected to each of the cylinders. The intake passage 3 is provided with an air cleaner 5 that filters intake gas, a first throttle valve 6, a compressor 7a of a turbocharger 7, an intercooler 8 for cooling intake gas, and a second throttle valve 9. The first throttle valve 6 and the second throttle valve 9 are well-known valves which open and close the intake passage 3. The exhaust passage 4 is provided with a turbine 7b of the turbocharger 7 and an exhaust gas purifying catalyst 10 as an exhaust gas purifying device which purifies exhaust gas. The exhaust gas purifying catalyst 10 is a well known catalyst that a three-way catalyst and the like are supported on a base material. As shown in this figure, the exhaust gas purifying catalyst 10 is located at the downstream of the turbine 7b.

Figure 2:
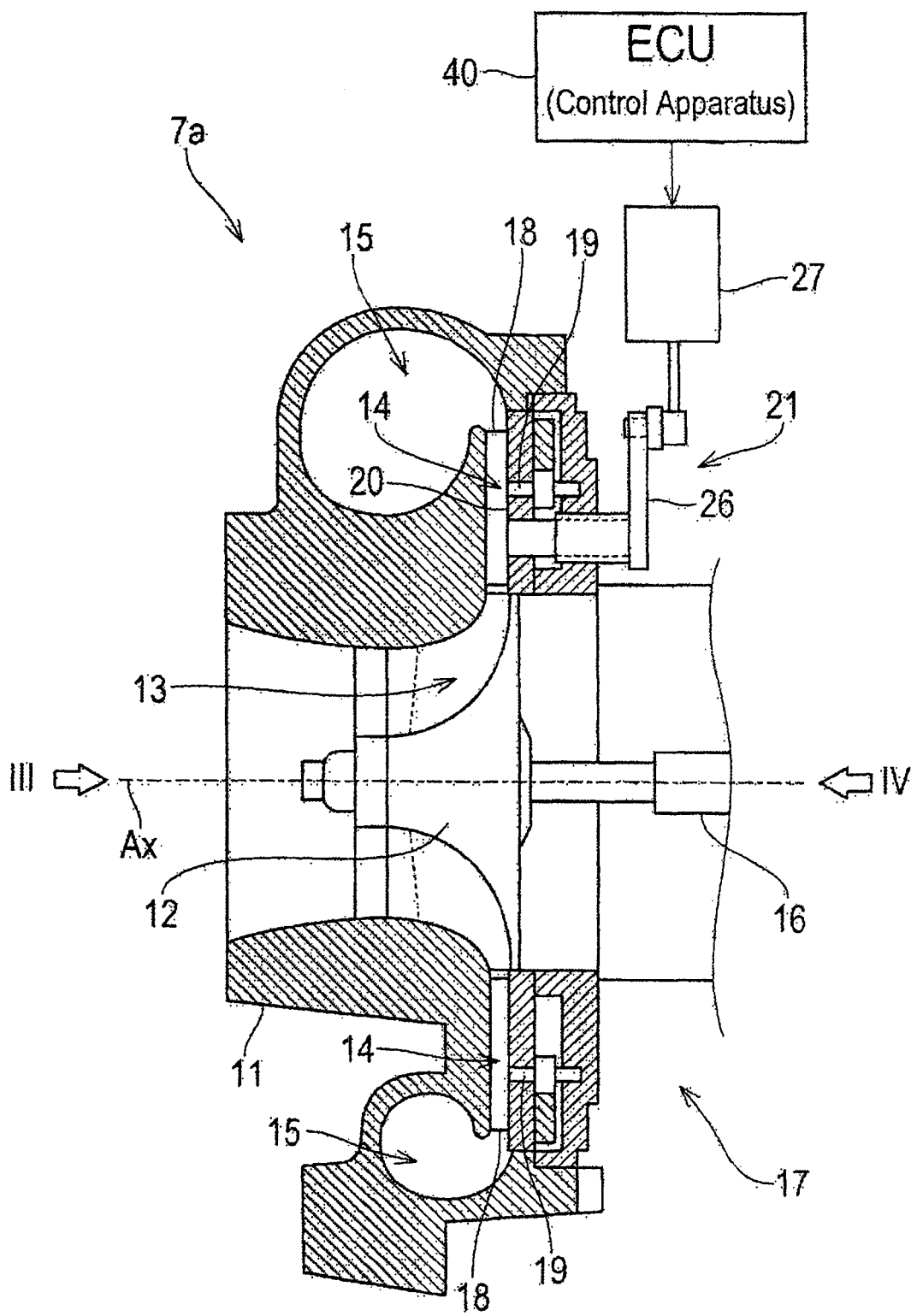
FIG. 2 is a view showing a cross-section of a compressor in FIG. 1.
Figure 3:
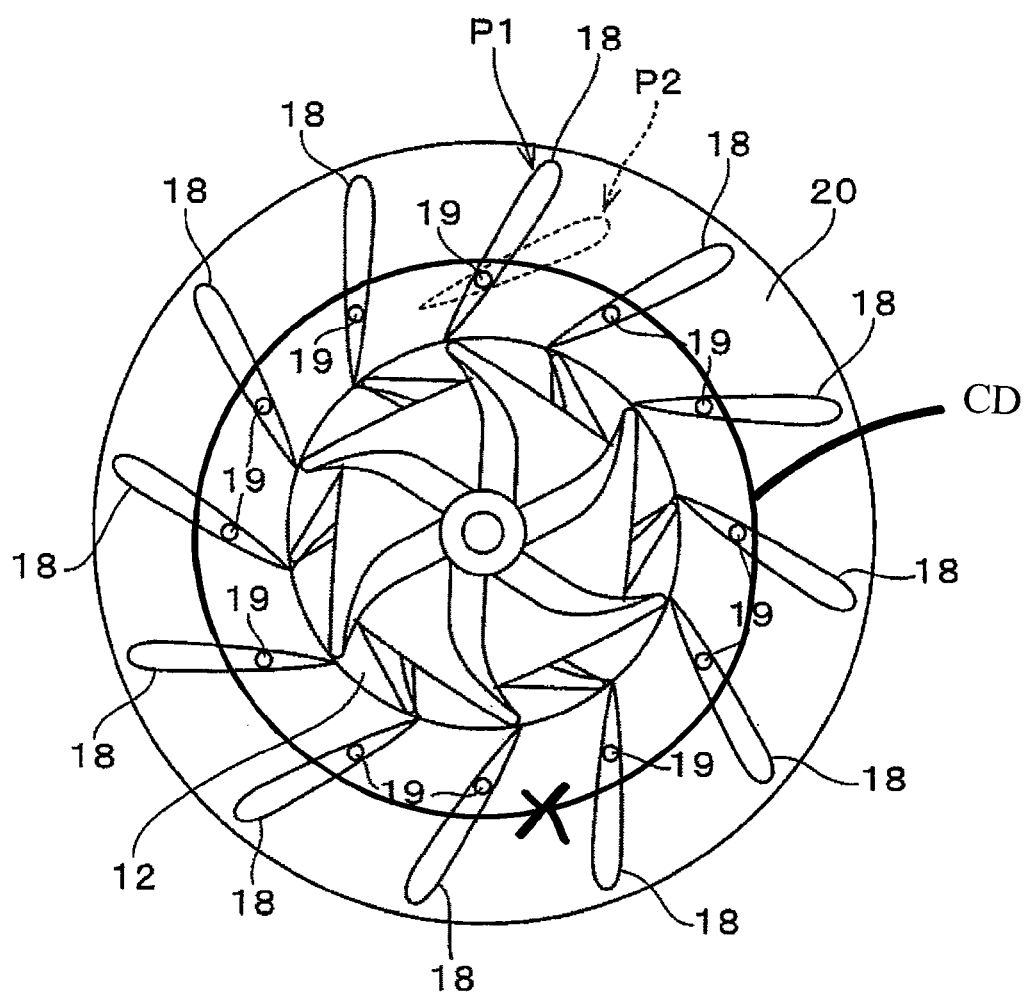
FIG. 3 is a view showing a part of the compressor viewed from the arrow III in FIG. 2.
Figure 4:
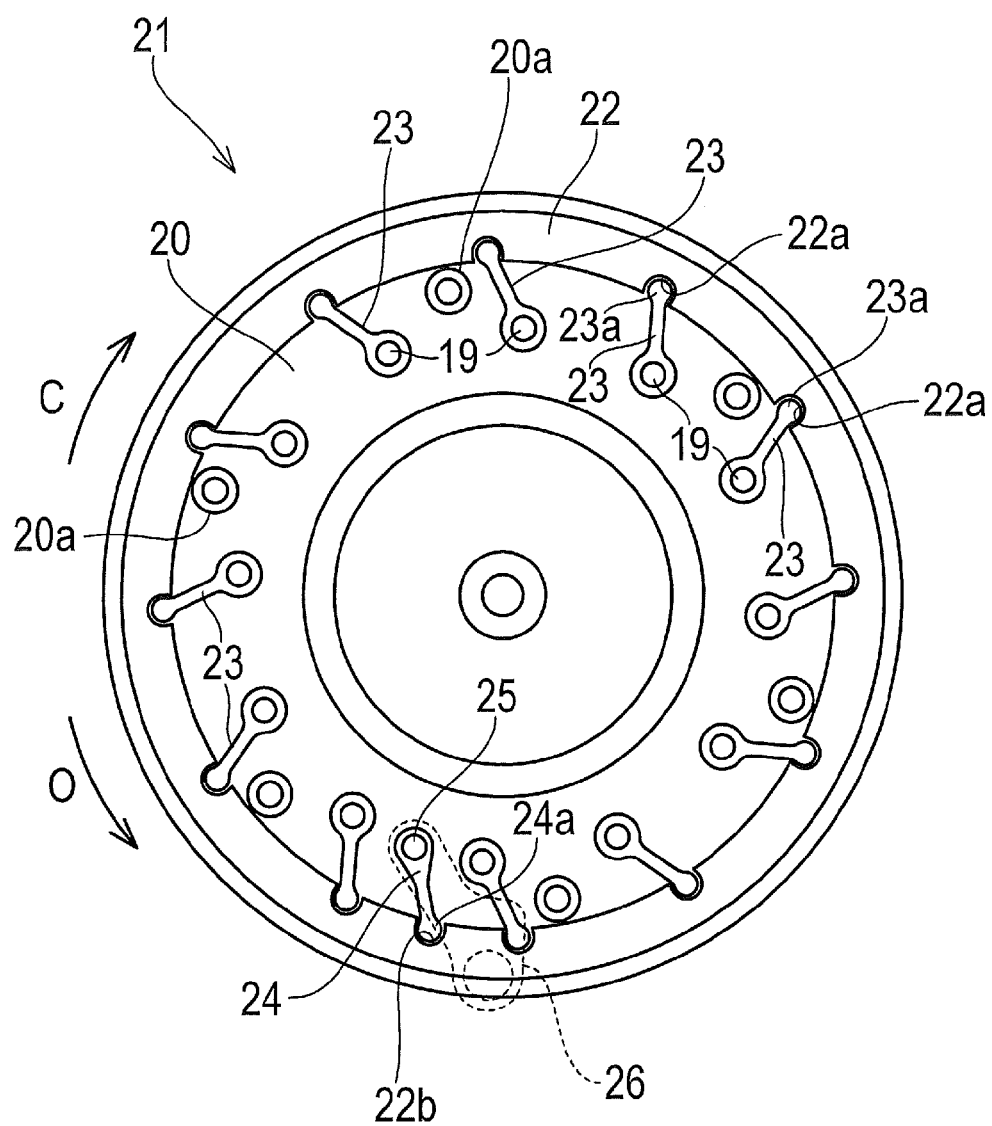
FIG. 4 is a view showing a part of the compressor viewed from the arrow IV in FIG. 2.

The compressor 7a of the turbocharger 7 will be described with reference to FIGS. 2 to 4. FIG. 2 shows a cross-section view of the compressor 7a. Further, FIG. 3 shows a part of the compressor 7a viewed in the direction of an arrow III in FIG. 2. FIG. 4 shows a part of the compressor 7a viewed in the direction of an arrow IV in FIG. 2. As shown in FIG. 2, the compressor 7a has a compressor housing 11 and a compressor wheel 12 housed in the compressor housing 11. The compressor housing 11 has: a wheel chamber 13 in which the compressor wheel 12 is arranged; a diffuser portion 14 which is located at an outer circumference of the wheel chamber 13 as being communicated with an outlet of the wheel chamber 13; and a spiral-shaped scroll chamber 15 which is located at an outer circumference of the diffuser portion 14 as being communicated with the diffuser portion 14. The turbocharger 7 has a rotating shaft 16 which is arranged rotatably around an axis line Ax. The compressor wheel 12 is attached to one end of the rotating shaft 16 so as to rotate with the rotating shaft 16. Although it is not shown, a turbine wheel of the turbine 7b is attached to the other end of the rotating shaft 16 so as to rotate with the rotating shaft 16. When the turbine wheel is driven by exhaust gas, thereby the compressor wheel 12 is driven.

The compressor 7a is provided with a movable vane mechanism 17. The movable vane mechanism 17 has plural diffuser vanes (hereinafter, referred to as vanes) 18 which are arranged at the diffuser portion 14, a base plate 20 to which the plural vanes 18 are attached so as to be rotatable around a pin 19 as a shaft portion, and a vane operation mechanism 21 which is arranged at the back face side of the base plate 20. The vanes 18 are components each having a well-known airfoil-shape to direct an intake gas flow. The intake gas discharged from the compressor wheel 12 flows into between the respective vanes 18. Thus, space between the vanes 18 is to be a flow passage of the intake gas. Each vane 18 is attached to one end of the pin 19 rotatably as one unit. As shown in FIG. 3, the pins 19 are arranged at regular intervals in the circumferential direction. By rotating each of the vanes 18 about the pin 19 thereof, so that the vanes 18 are rotated so as to open and close the flow passage of the intake gas at each gap between each two vanes 18. Thereby, throttled quantity of a flow passage of the intake gas is changed.

As shown in FIG. 2 and FIG. 4, the vane operation mechanism 21 has a drive ring 22, plural vane arms 23 located at an inner side of the drive ring 22, a drive arm 24 located between each pair of the vane arms 23, an operation lever 26 connected to the drive arm 24 via a pin 25 so as to be integrally rotatable, and an actuator 27 (see FIG. 2) for operating the operation lever 26. The drive ring 22 is supported by plural rollers 20a attached to the base plate 20 so as to be rotatable around the axis line Ax of the rotating shaft 16. The number of the vane arms 23 is the same as that of the vanes 18. Each vane arm 23 is connected to the other end portion of each pin 19 protruding by penetrating the base plate 20 to a rear face side so as to be integrally rotatable. Accordingly, the vane 18 and the vane arm 23 rotate around the pin 19 as one unit.

Plural vane-arm groove portions 22a and a drive-arm groove portion 22b which is located between each pair of the groove portions 22a are arranged at the inner circumference of the drive ring 22. The number of the vane-arm groove portions 22a is the same as that of the vane arms 23. The vane-arm groove portions 22a are arranged at equal intervals in the circumferential direction. A tip portion 23a of each vane arm 23 is fitted to each vane-arm groove portion 22a. Meanwhile, a tip portion 24a of the drive arm 24 is fitted to the drive-arm groove portion 22b. Accordingly, when the operation lever 26 is rotated in the direction of arrow C of FIG. 4 (i.e., the clockwise direction), the rotation is transmitted to the drive ring 22 from the pin 25 to rotate the drive ring 22 in the same direction. As being interlocked with those operations, each vane arm 23 is rotated around each pin 19 in the clockwise direction of FIG. 4. Accordingly, each vane 18 is also rotated around each pin 19 in the clockwise direction, so that the spaces between the vanes 18 are decreased. Thereby, the throttled quantity of the flow passage of the intake gas is increased. On the other hand, when the operation lever 26 is rotated in the direction of arrow O of FIG. 4 (i.e., the counterclockwise direction), the drive ring 22 is rotated in the opposite direction to the above. In accordance therewith, each vane 18 is rotated around each pin 19 in the counterclockwise direction. Accordingly, the spaces between the vanes 18 are increased, and the throttled quantity of the flow passage of the intake gas is decreased.

The actuator 27 is provided so as to be able to drive each vane 18 between a maximum position P1 which is shown as a solid line in FIG. 3 and a minimum position P2 which is shown as a broken line in FIG. 3 by controlling the operation lever 26. The maximum position P1 is a position where the size of the space between the vanes 18 becomes maximum. Thereby, when each vane 18 is located at this position P1, the throttled quantity of the flow passage of the intake gas becomes minimum. On the other hand, the minimum position P2 is a position where the size of the space between the vanes 18 becomes minimum. Thereby, when each vane 18 is located at this position P2, the throttled quantity of the flow passage of the intake gas becomes maximum.

Returning to FIG. 1, the description of the engine 1 will be continued. As shown in FIG. 1, the engine 1 has a high-pressure EGR passage 30 and a low-pressure EGR passage 31 each of which connects the intake passage 3 and the exhaust passage 4. These EGR passages 30, 31 are provided for recirculating a part of the exhaust gas to the intake passage 3. As shown in this figure, the high-pressure EGR passage 30 connects an upstream section of the turbine 7b in the exhaust passage 4 and a downstream section of the intercooler 8 in the intake passage 3. The high-pressure EGR passage 30 is provided with a high-pressure EGR valve 32 to open and close this passage 30. The low-pressure EGR passage 31 connects a downstream section of the exhaust gas purifying catalyst 10 in the exhaust passage 4 and an upstream section of the compressor 7a in the intake passage 3. The low-pressure EGR passage 31 is provided with a low-pressure EGR valve 33 to open and close this passage 31 and a filter 34 for cleaning up the foreign matter in the exhaust gas. The filter 34 is a well-known filter which traps a particulate matters such as a carbon particulate and the like being included in the exhaust gas.

The operation of the movable vane mechanism 17 is controlled by an engine control unit (ECU) 40 as a control apparatus. The ECU 40 is a well-known computer unit which is configured as a computer including a microprocessor and peripheral devices, such as a RAM and a ROM, which are necessary for the operations of the microprocessor. The ECU 40 controls operating states of the engine 1 based on output signals from various sensors provided to the engine 1. For example, the ECU 40 calculates an amount of the exhaust gas to be recirculated to the intake passage 3 based on the operating states of the engine 1. The ECU 40 controls an opening of the high-pressure EGR valve 32 and an opening of the low-pressure EGR valve 33, respectively so as to recirculate the calculated amount of the exhaust gas to the intake passage 3. The ECU 40 is connected with various sensors for detecting operating states of the engine 1. For example, the ECU 40 is connected with a rotation number sensor 41 which outputs a signal corresponding to a rotation number of the engine 1, and connected with a catalyst temperature sensor 42 which outputs a signal corresponding to temperature of the exhaust gas purifying catalyst 10. In addition to the above sensors, various sensors are further connected to the ECU 40, but they are omitted in the figure.

The ECU 40 controls the operation of the actuator 27 so that the size of the space between the vanes 18 is controlled depending on the operating states of the engine 1. For example, the ECU 40 controls the operation of the actuator 27 so that the size of the space between the vanes 18 is increased, i.e. the throttled quantity of the flow passage of the intake gas is decreased as the rotation number of the engine 1 is increased. Furthermore, the ECU 40 controls the operation of the actuator 27 depending on whether the low-pressure EGR valve 33 is opened or not. As well known, the exhaust gas purifying catalyst 10 and the filter 34 may be broken, when a shock is given to them. When the low-pressure EGR valve 33 is opened, the exhaust gas which includes broken pieces of the exhaust gas purifying catalyst 10 or the filter 34 as foreign matters is led to the inside of the compressor 7a. At this moment, when the foreign matters collide with the vane 18 at high speed, there is a possibility that the vane 18 is damaged. The ECU 40 controls the operation of the actuator 27 so that throttled quantity of the flow passage of the intake gas is more decreased when the exhaust gas is led to the compressor 7a by opening the low-pressure EGR valve 33 as compared with a case when the exhaust gas is not led to the compressor 7a by closing the low-pressure EGR valve 33.

Figure 5:
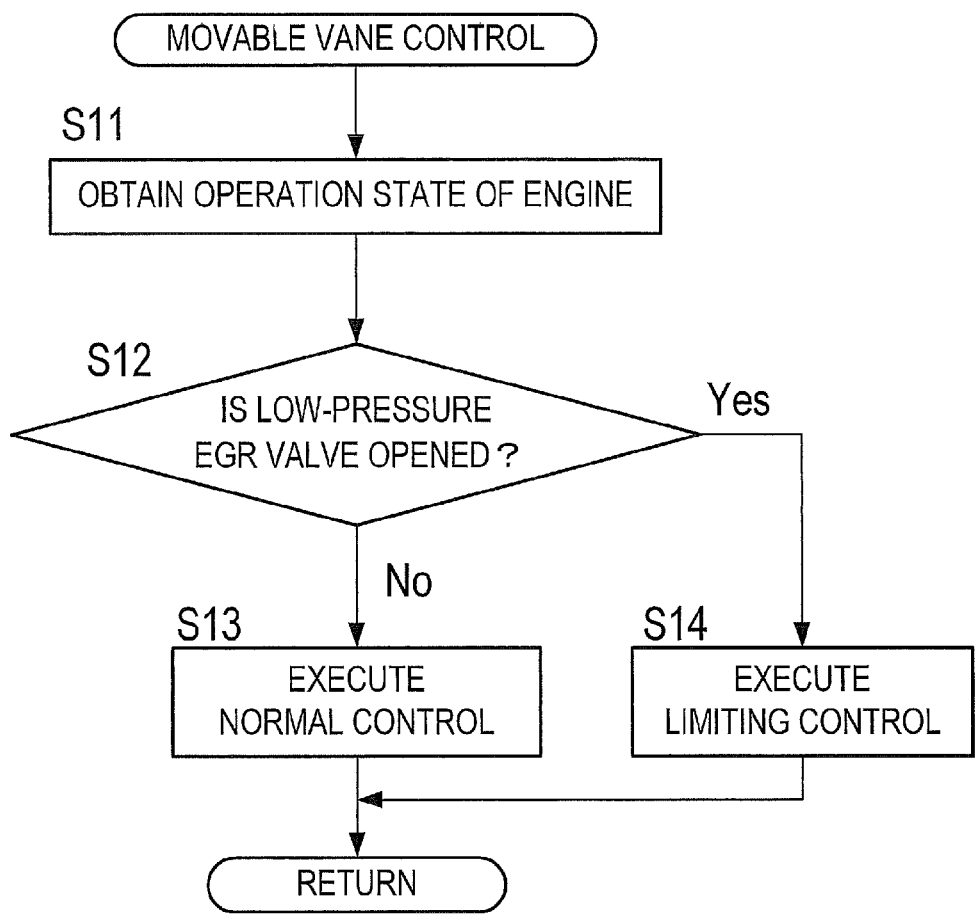
FIG. 5 is a flowchart showing a movable vane control routine executed by an ECU in FIG. 1.

FIG. 5 shows a movable vane control routine which is executed by the ECU 40 in order to control the operation of the movable vane mechanism 17 in this manner. The ECU 40 executes the control routine repeatedly in a predetermined cycle during operation of the engine 1. In the control routine in FIG. 5, the ECU 40 first obtains the operating state of the engine 1 at Step S11. For example, the ECU 40 obtains the rotation number of the engine 1 and the temperature of the exhaust gas purifying catalyst 10 as the operating state of the engine 1.

At next step S12, the ECU 40 determines whether or not the low-pressure EGR valve 33 is opened. If the ECU 40 determines that the low-pressure EGR valve 33 is closed, the ECU 40 proceeds to step S13 and executes a normal control for controlling operations of the movable vane mechanism 17 so that each vane 18 is opened and closed between the maximum position P1 and the minimum position P2. Thereafter, the ECU 40 ends the current control routine. In the normal control, the positions of the vanes 18 are controlled based on both of the rotation number of the engine 1 and the opening of the low-pressure EGR valve 33. In order to recirculate the exhaust gas to the intake passage 3 via the low-pressure EGR passage 31, it is necessary that pressure of an end portion of an exhaust passage 4 side of the low-pressure EGR passage 31 is higher than pressure of an end portion of an intake passage 3 side of the low-pressure EGR passage 31. A difference in pressure between the end portions of the low-pressure EGR passage 31 is decreased as the low-pressure EGR valve 33 is opened more greatly. The ECU 40 controls the positions of the vanes 18 so that the cross-section area between the vanes 18 is decreased as the low-pressure EGR valve 33 is opened bigger more greatly. Furthermore, the ECU 40 controls the positions of the vanes 18 so that the cross-section area between the vanes 18 is increased as the rotation number of the engine 1 is increased. In the normal control, priority numbers are given to a control which is based on the rotation number of the engine 1 and a control which is based on the opening degree of the low-pressure EGR valve 33 respectively, and the positions of the vanes 18 are controlled in accordance with the priority numbers.

On the other hand, if the ECU 40 determines that the low-pressure EGR valve 33 is opened, the ECU 40 proceeds to step S14 and executes a limiting control. Thereafter, the ECU 40 ends the current control routine. In the limiting control, the operation of the movable vane mechanism 17 is controlled so that each vane 18 is driven to a position which is closer to the maximum position P1 than a position where is set in the normal control, i.e. a position where the throttled quantity of the flow passage of the intake gas is more decreased when compared with a case of the normal control. The position of each vane 18 which is set in the limiting control may be a position where a damage of the vane 18 by the foreign matters can be substantially suppressed, and the position may be appropriately set according to a capacity of the compressor 7a and the like.

In the first embodiment, the operation of the movable vane mechanism 17 is controlled so that the throttled quantity of the flow passage of the intake gas is decreased, i.e. the space between the vanes 18 is more increased when the low-pressure EGR valve 33 is opened as compared with a case when the low-pressure EGR valve 33 is closed. Thereby, it is possible to suppress the foreign matters in the exhaust gas that collide against the vanes 18. Furthermore, by decreasing the throttled quantity of the flow passage of the intake gas in this manner, it is possible to decrease a flow velocity of the intake gas in the diffuser portion 14. Thereby, it is possible to suppress the foreign matters that collide against the vanes 18 at high speed. Accordingly, according to the first embodiment, it is possible to recirculate the exhaust gas to the upper stream of the compressor 7a, and it is possible to suppress the damage of the vane 18.

(Second Embodiment)

Figure 6:
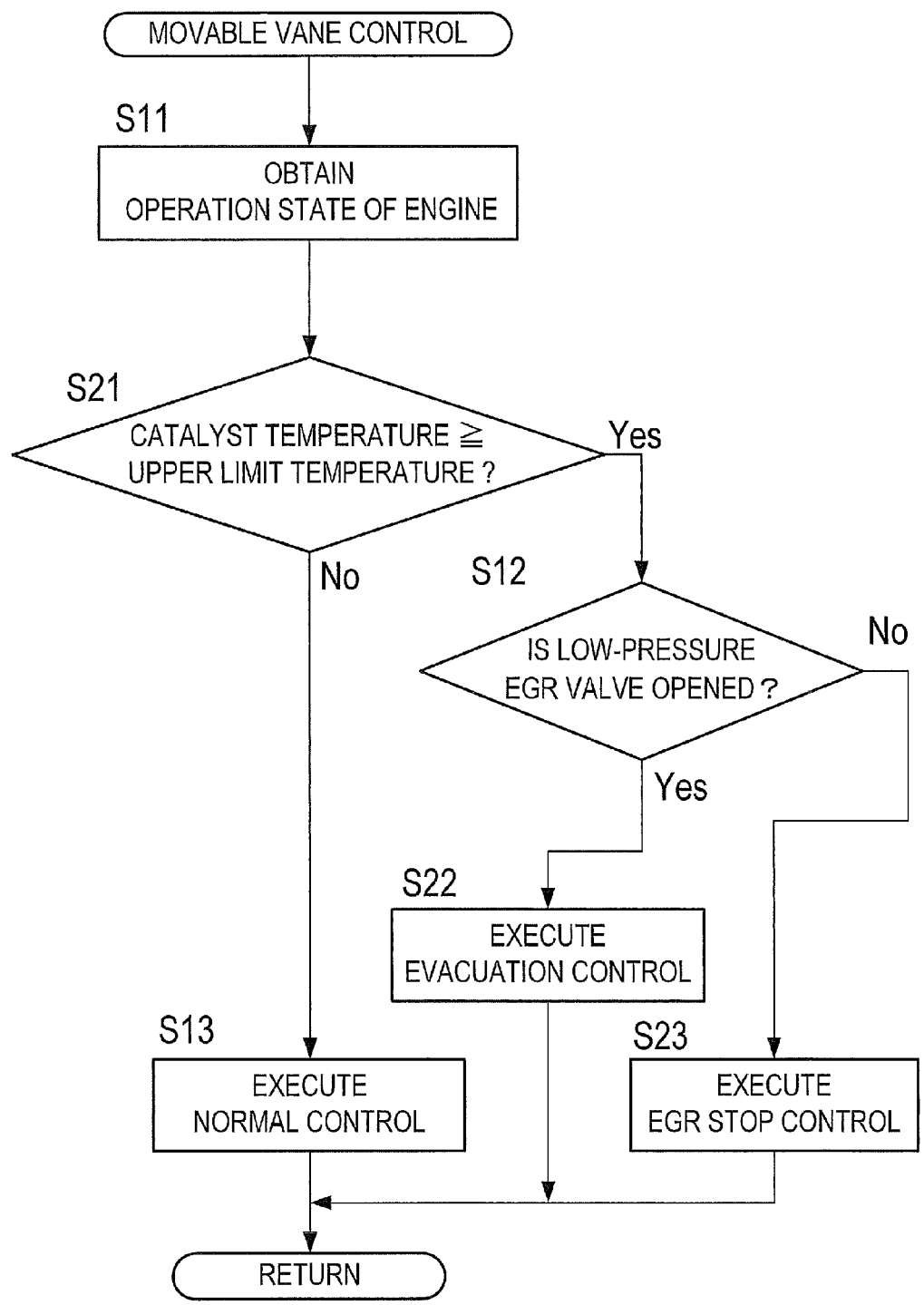
FIG. 6 is a flowchart showing a movable vane control routine executed by the ECU in a second embodiment.

Next, a control apparatus according to a second embodiment of the present invention will be described with reference to FIG. 6. FIG. 1 is referred also in this embodiment with regard to the engine 1. FIGS. 2 to 4 are referred also in this embodiment with regard to the compressor 7a. FIG. 6 shows a movable vane control routine which is executed by the ECU 40 repeatedly in a predetermined cycle during operation of the engine 1 in order to control the operation of the movable vane mechanism 17 in this embodiment. In this control routine, the same processes as those in FIG. 5 are denoted by the same reference numeral as those in FIG. 5, and descriptions thereof will be omitted.

In the control routine in FIG. 6, the ECU 40 first obtains the operating state of the engine 1 at Step S11. At the next step S21, the ECU 40 determines whether or not the temperature of the exhaust gas purifying catalyst 10 is equal to or higher than a predetermined upper limit temperature. As well known, the exhaust gas purifying catalyst 10 and the filter 34 become fragile when they are overheated. The predetermined upper limit temperature is set to a criterion to determine whether or not the exhaust gas purifying catalyst 10 or the filter 34 is in a fragile state. The predetermined upper limit temperature is appropriately set based on a lower limit of a range of temperature at which the exhaust gas purifying catalyst 10 or the filter 34 becomes fragile. If the ECU 40 determines that the temperature of the exhaust gas purifying catalyst 10 is less than the upper limit temperature, the ECU 40 proceeds to step S13 and executes the normal control. Thereafter, the ECU 40 ends the current control routine.

On the other hand, if the ECU 40 determines that the temperature of the exhaust gas purifying catalyst 10 is equal to or more than the upper limit temperature, the ECU 40 proceeds to step S12 and determines whether or not the low-pressure EGR valve 33 is opened. If the ECU 40 determines that the low-pressure EGR valve 33 is opened, the ECU 40 proceeds to step S22 and executes an evacuation control. Thereafter, the ECU 40 ends the current control routine. In the evacuation control, the operation of the movable vane mechanism 17 is controlled so that each vane 18 is driven to a position where the throttled quantity of the flow passage of the intake gas is the smallest within positions where a surge of the compressor 7a can be avoided.

On the other hand, if the ECU 40 determines that the low-pressure EGR valve 33 is closed, the ECU 40 proceeds to step S23 and executes an EGR stop control. Thereafter, the ECU 40 ends the current control routine. In the EGR stop control, the ECU 40 controls the position of each vane 18 so that the space between the vanes 18 is increased as the rotation number of the engine 1 is increased.

In the second embodiment, each vane 18 is driven to the position where the throttled quantity of the flow passage of the intake gas is the smallest within the positions where the surge of the compressor 7a can be avoided, when the temperature of the exhaust gas purifying catalyst 10 is equal to or more than the predetermined upper limit temperature and the low-pressure EGR valve 33 is opened. Thereby, it is suppressed the foreign matters in the exhaust gas that collide against the vane 18, and it is possible to suppress the damage of the vane 18. Furthermore, by driving each vane 18 to such position, it is possible to suppress the surge of the compressor 7a.

In regard to the evacuation control executed in this embodiment, each vane 18 may be driven so that a prevention of the surge of the compressor 7a is given priority over a decrease of the throttled quantity of the flow passage of the intake gas. As well known, it is necessary to decrease the space between vanes 18 by increasing the throttled quantity of the flow passage of the intake gas in order to prevent the surge of the compressor 7a. In the evacuation control, each vane 18 may be driven to an appropriately position where the surge of the compressor 7a can be avoided, if the throttled quantity of the flow passage of the intake gas is smaller as compared to a case when the exhaust gas is not led to the compressor 7a. Thereby, it is possible to prevent the surge of the compressor 7a.

(Third Embodiment)

Figure 7:
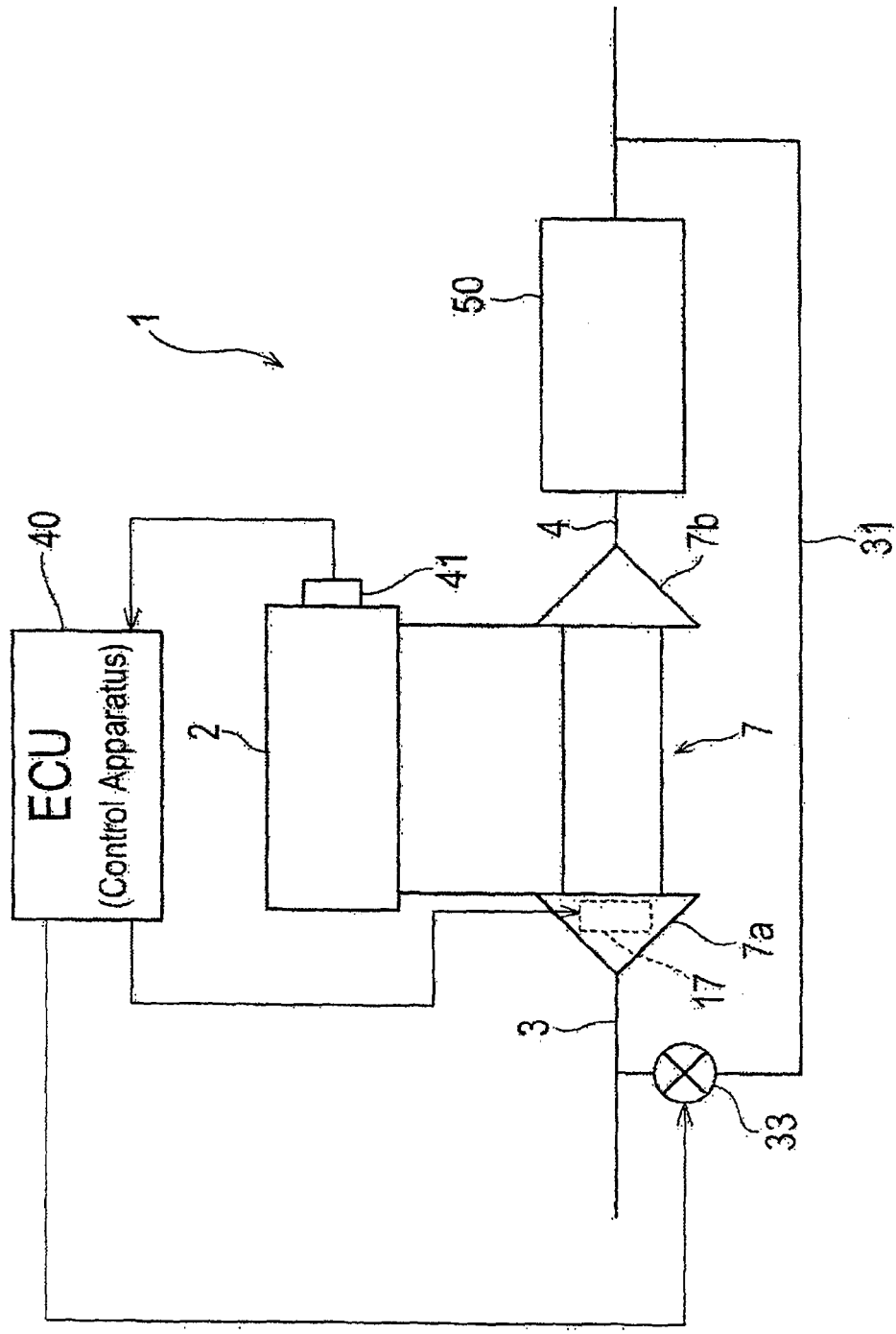
FIG. 7 is a view schematically showing the internal combustion engine incorporated in a control apparatus according to a third embodiment of the present invention.

Next, a control apparatus according to a third embodiment of the present invention will be described with reference to FIGS. 7 to 9. FIG. 7 schematically shows an internal combustion engine in which a control apparatus of this embodiment is incorporated. In FIG. 7, the same components as those in FIG. 1 are denoted by the same reference numeral as those in FIG. 1, and descriptions thereof will be omitted. In this embodiment, a particulate filter (hereinafter, referred to as a filter) 50 which traps particulate matters (PM) such as soot and the like being included in the exhaust gas is provided in the exhaust passage 4 in place of the exhaust gas purifying catalyst 10. As shown in this figure, the filter 50 is located downstream of the turbine 7b as with the exhaust gas purifying catalyst 10. Furthermore, in this embodiment, the high-pressure EGR passage 30 is omitted. In this embodiment, the compressor 7a is also provided with the movable vane mechanism 17 as with the above embodiments.

An amount of the PM which is accumulated on the filter 50 is increased in accordance with an operating time of the engine 1. A trapping performance of the filter 50 is decreased in accordance with the amount of the PM. The ECU 40 executes an elevating temperature operation, the elevating temperature operation elevating the temperature of the filter 50 up to a target temperature at which the PM is oxidized and removed, for example 600° C., at regular intervals. Thereby, the PM accumulated on the filter 50 is oxidized and removed, and the performance of the filter 50 is recovered. The elevating temperature operation is also referred to as a PM regeneration treatment.

Figure 8:
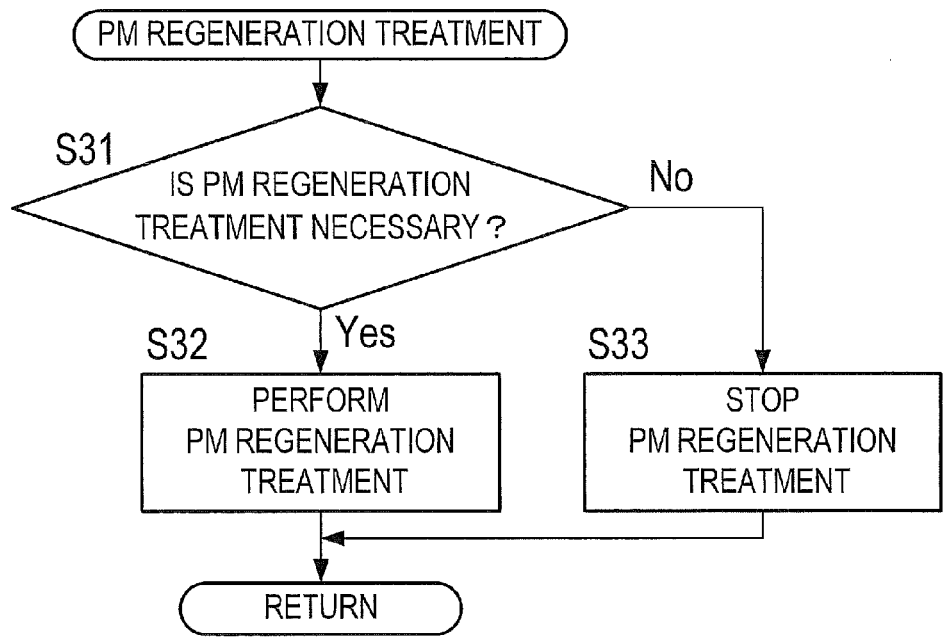
FIG. 8 is a flowchart showing a PM regeneration treatment routine executed by the ECU in FIG. 7.

FIG. 8 shows a PM regeneration treatment routine executed by the ECU 40. The ECU 40 executes the PM regeneration treatment routine repeatedly in a predetermined cycle in parallel to the other various processing executed by the ECU 40. In the PM regeneration treatment routine, the ECU 40 first determines whether or not it is necessary to perform the PM regeneration treatment for the filter 50. The determination of necessity of the PM regeneration treatment may be performed by a well-known method. For example, sedimentation amount PM on the filter 50 is estimated based on the physical quantities correlated with the sedimentation amount PM, such as a pressure loss between an inlet and outlet of the filter 50, the operating time of the engine 1, and running distance of the vehicle. And, when the sedimentation amount PM exceeds a predetermined determination value, it is possible to determine the performance of the PM regeneration is necessary.

If the ECU 40 determines that it is necessary to perform the PM regeneration treatment, the ECU 40 proceeds to step S32 and performs the PM regeneration treatment. The elevating temperature of the filter 50 in the PM regeneration treatment may be elevated by a well known temperature elevating method. For example, the engine 1 is operated so that an air-fuel ratio of the exhaust gas is richer than the theoretical air fuel ratio, and the temperature of the filter 50 may be elevated by combusting the fuel which is included in the exhaust gas at the exhaust passage 4. Furthermore, a fuel addition valve is provided in the exhaust passage 4, and the temperature of the filter 50 may be elevated by combusting the fuel which is added from the fuel addition valve. Thereby, the temperature of the filter 50 is elevated up to the target temperature of the PM regeneration treatment. Thereafter, the ECU 40 ends the current control routine.

On the other hand, if the ECU 40 determines that it is not necessary to perform the PM regeneration treatment, the ECU 40 proceeds to step S33 and stops the PM regeneration treatment. Thereafter, the ECU 40 ends the current control routine.

Figure 9:
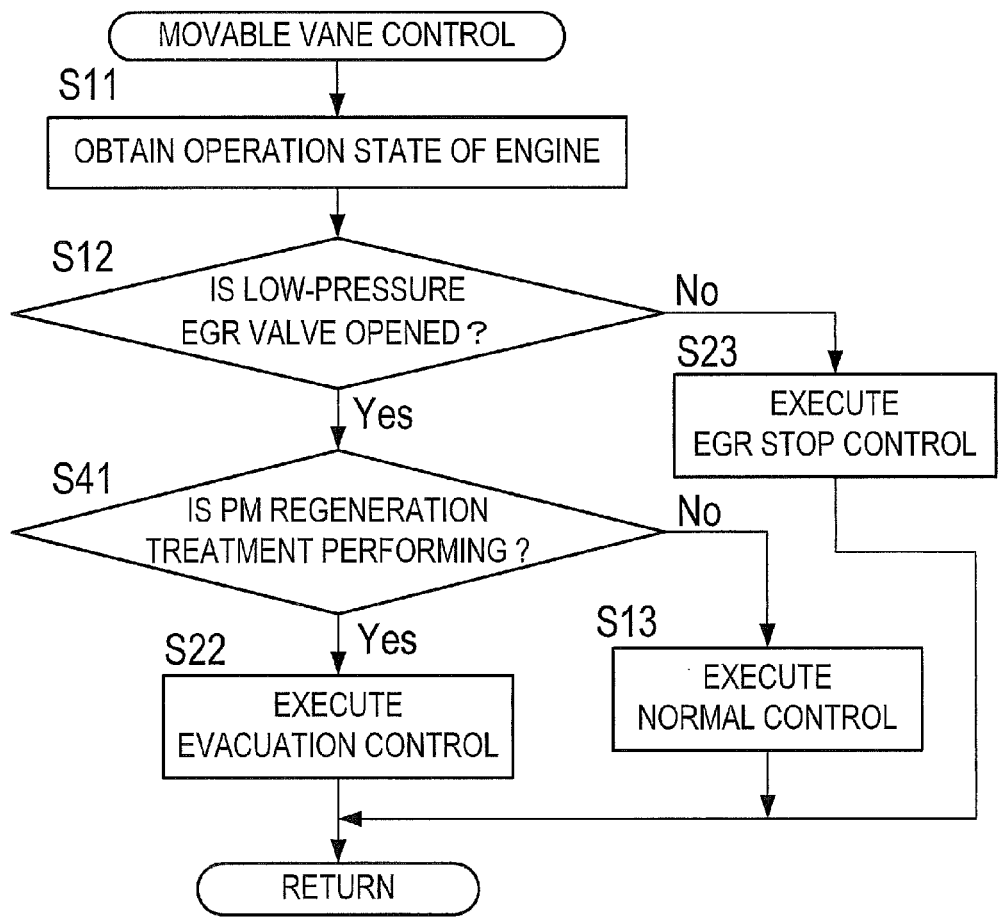
FIG. 9 is a flowchart showing a movable vane control routine executed by the ECU in FIG. 7.

FIG. 9 shows a movable vane control routine executed by the ECU 40 in this embodiment. In this control routine, the same processes as those in FIG. 5 or 6 are denoted by the same reference numerals, and descriptions thereof will be omitted. In this control routine, the ECU 40 executes the processes until step S12 as with FIG. 5. At step S12, if determining that the low-pressure EGR valve 33 is closed, the ECU 40 proceeds to step S23 and executes an EGR stop control. Thereafter, the ECU 40 ends the current control routine.

On the other hand, if the ECU 40 determines that the low-pressure EGR valve 33 is opened, the ECU 40 proceeds to step S41 and determines whether or not the PM regeneration treatment is under way. If the ECU 40 determines that the PM regeneration treatment is under way, the ECU 40 proceeds to step S22 and executes the evacuation control. Thereafter, the ECU 40 ends the current control routine. On the other hand, if the ECU 40 determines that the PM regeneration treatment is not under way, the ECU 40 proceeds to step S13 and executes the normal control. Thereafter, the ECU 40 ends the current control routine.

When the PM regeneration treatment is under way, the PM is oxidized and removed from the filter 50. Thereby, there is a possibility that the foreign matters in the exhaust gas are increased at the downstream side of the filter 50. Furthermore, when the PM regeneration treatment is under way, the temperature of the filter 50 is elevated. Thereby, the temperature of the foreign matter becomes high. When the low-pressure EGR valve 33 is opened, there is a possibility that the foreign matters of high temperature are circulated to the intake passage 3 with the exhaust gas and flows into the compressor 7a.

In this embodiment, when the low-pressure EGR valve 33 is opened and the PM regeneration treatment is in performing, the evacuation control is executed. Thereby, even though the foreign matters of high temperature flow into the compressor 7a, it is possible to suppress the foreign matter that collide against the vane 18. Accordingly, it is possible to suppress the damage of the vane 18.

The engine 1 which the control apparatus of this embodiment is applied to is not limited to the engine where the filter 50 is provided in the exhaust passage 4. The control apparatus of this embodiment may be applied to the engine 1 which is provided with various kinds of exhaust gas purifying devices the temperature of which is elevated at regular intervals for recovering the performance thereof, the exhaust gas purifying devices being provided in the exhaust passage 4. For example, the control apparatus may be applied to the engine 1 which is provided with a storage reduction type NOx catalyst in place of the filter. As well known, the storage reduction type NOx catalyst is decreased in a purification performance thereof by poisoning of a sulfur component which is included in the exhaust gas. A S-poisoning recovery treatment is performed against the NOx catalyst at regular intervals, the S-poisoning recovery treatment removing the sulfur component from the NOx catalyst by elevating the temperature of the NOx catalyst up to a predetermined target temperature, for example 650° C., while the air fuel ratio of the exhaust gas is richer than the theoretical air fuel ratio. When the S-poisoning recovery treatment is performed, since the temperature of the NOx catalyst is elevated, there is a possibility that the foreign matters of high temperature are generated in the exhaust gas as with a case when the PM regeneration treatment is performed. Thus, in the engine 1 that the storage reduction type NOx catalyst is provided in the exhaust passage 4 in this manner, the evacuation control may be executed when the low-pressure EGR valve 33 is opened and the S-poisoning recovery treatment is under way. Thereby, since it is possible to suppress the foreign matters of high temperature that collide against the vane 18, it is possible to suppress the damage of the vane 18. Furthermore, the control apparatus of this embodiment may be applied to the engine 1 which is provided with an exhaust gas purifying device in place of the filter, the exhaust gas purifying device supporting the storage reduction type NOx catalyst on the particulate filter. In this case, the evacuation control may be executed when either the PM regeneration treatment or the S-poisoning recovery treatment is under way and the low-pressure EGR valve 33 is opened. By controlling the movable vane mechanism 17 in this manner, it is possible to suppress the damage of the vane 18.

(Fourth Embodiment)

Figure 10:
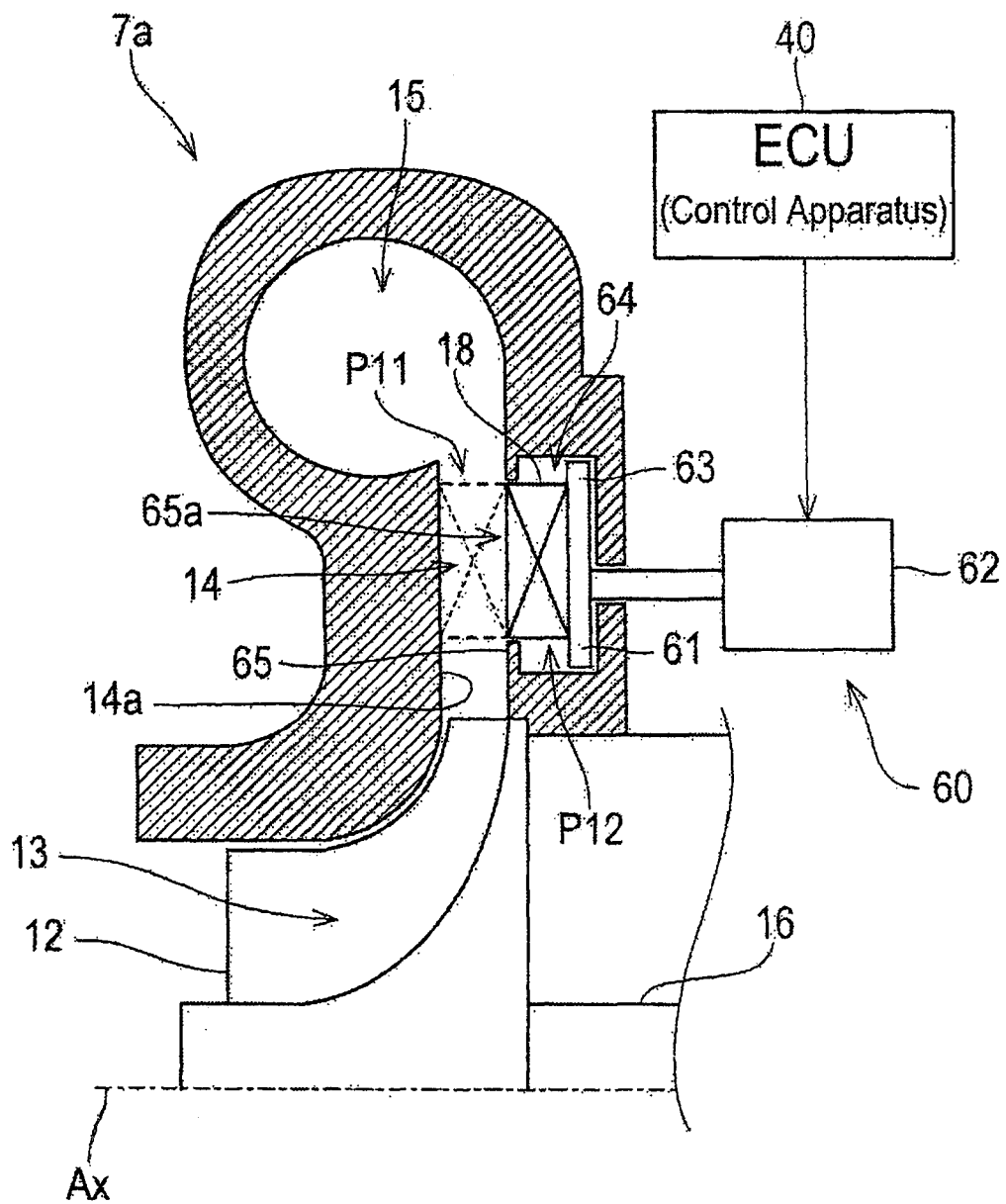
FIG. 10 is a view showing a compressor of the turbocharger of the internal combustion engine incorporated in a control apparatus according to a fourth embodiment of the present invention.

Next, a control apparatus according to a fourth embodiment of the present invention will be described with reference to FIG. 10. Also in this embodiment, the same components as those in the first embodiment are denoted by the same reference numerals, and descriptions thereof will be omitted. FIG. 10 shows a cross-section view of the compressor 7a in this embodiment. As shown in this figure, in the fourth embodiment, a movable vane mechanism 60 which differs from that of the first embodiment is provided in the compressor 7a.

The movable vane mechanism 60 includes a movable portion 61 which is provided movably in a direction of the axis AX and an actuator 62 for driving the movable portion 61. The movable portion 61 includes a circular base plate 63 where the plural vanes 18 are arranged. In this figure, only one vane of the plural vanes 18 is shown. The plural vanes 18 are arranged to be aligned concyclically at regular intervals as with the first embodiment. Furthermore, as shown in this figure, each vane 18 is extended in the direction of the axis Ax from the same surface of the base plate 63. The compressor housing 11 is provided with a housing chamber 64 so as to be along with the diffuser portion 14 in the direction of the axis Ax. The diffuser portion 14 and the housing chamber 64 are separated from each other by a partition wall 65. Penetrating holes 65a are formed on the partition wall 65 corresponding to the plural vanes 18. The movable portion 61 is housed in the housing chamber 64 so that the vanes 18 are inserted into the penetrating holes 65a respectively. The actuator 62 drives the movable portion 61 between a projected position P11 where the tips 18a of the vanes 18 contact respectively with a facing surface 14a facing to the partition wall 65 and a housed position P12 where the vanes 18 are housed in the partition wall 65. The cross section area of the diffuser portion 14 is a minimum when the movable portion 61 exists at the projected position P11, and is a maximum when the movable portion 61 exists at the housed position P12. Thereby, when the movable portion 61 exists at the projected position P11, a throttled quantity of the diffuser portion 14 is a maximum. When the movable portion 61 exists at the housed position P12, the throttled quantity of the diffuser portion 14 is a minimum.

Also in this embodiment, the ECU 40 controls an operation of the movable vane mechanism 60 by executing the control routine shown in FIGS. 5, 6, and 9. The fourth embodiment is different from the above described embodiments, in the movable vane mechanism which is provided in the compressor 7a is. Thereby, control contents of the normal control, the limiting control, the EGR stop control, and the evacuation control are different. Except those controls, each process of each control routine is executed as with the above embodiments. Hereinafter, the control contents of each control will be described.

In the normal control of this embodiment, the ECU 40 controls the position of the movable portion 61 based on both of the rotation number of the engine 1 and the opening of the low-pressure EGR valve 33. In the movable vane mechanism 60, the position of the movable portion 61 is controlled so that the movable portion 61 is moved to the projected position P11 when the rotation number of the engine 1 is less than a predetermined determination rotation number, and the movable portion 61 is moved to the housed position P12 when the rotation number of the engine 1 is equal to or higher than the determination rotation number. As described above, the difference between the pressure of the end portion of the intake passage 3 side of the low-pressure EGR passage 31 and the pressure of the end portion of the exhaust passage 4 side of the low-pressure EGR passage 31 is decreased as the low-pressure EGR valve 33 is opened more greatly. Thereby, when the difference in pressure is less than a predetermined value, the operation of the actuator 62 is controlled so that the movable portion 61 is moved to the housed position P12. Also in this embodiment, in the normal control, the control based on the rotation number of the engine 1 and the control based on the opening of the low-pressure EGR valve 33 are given to priority numbers respectively, and the position of the vanes 18 are controlled in accordance with the priority numbers.

In the limiting control of this embodiment, the movable portion 61 is moved to the housed position P12. In the EGR stop control of this embodiment, the ECU 40 controls the position of the movable portion 61 based on the rotation number of the engine 1. A specific control method may be the same as a method of the normal control described above. Thus, detailed descriptions thereof will be omitted. In the evacuation control of this embodiment, the ECU 40 moves the movable portion 61 to the housed position P12.

According to the fourth embodiment, since the ECU 40 executes the control routines shown in FIGS. 5, 6, and 9, the movable portion 61 is moved to the housed position P12 when the low-pressure EGR valve 33 is opened; when the temperature of the exhaust gas purifying catalyst 10 is equal to or higher than the predetermined upper limit temperature and the low-pressure EGR valve 33 is opened; or when the PM regeneration treatment is under way and the low-pressure EGR valve 33 is opened. By controlling the operation of the movable vane mechanism 60 in this manner, it is possible to avoid the foreign matters in the exhaust gas that collide against the vane 18. Thereby, it is possible to suppress the damage of the vane 18.

The present invention is not limited to the above-described embodiments, and may be executed in various modes. The internal combustion engine to which the present invention is applied is not limited to the internal combustion engine shown in the above-described embodiments. The present invention may be applied to various internal combustion engines where: the compressor is provided with the movable vane mechanism; and the downstream side of the exhaust gas purifying catalyst or the filter in the exhaust passage and the upstream side of the compressor in the intake passage are connected by the EGR passage. The control routine in FIG. 6 of the second embodiment and the control routine in FIG. 9 of the third embodiment above described may be executed in parallel. In this case, for example, priority numbers may be given to the control routines in advance respectively, and the operation of the movable vane mechanism may be controlled by executing these routines in accordance with the priority numbers.

The invention claimed is:

1. A control apparatus applied to an internal combustion engine,
the internal combustion engine including:
a turbocharger having a turbine which is provided in an exhaust passage and a compressor which is provided in an intake passage;
an exhaust gas purifying device which is arranged to purify exhaust gas at a section downstream of the turbine in the exhaust passage; and
an EGR passage which connects a section downstream of the exhaust gas purifying device in the exhaust passage and a section upstream of the compressor in the intake passage,
the compressor including: a compressor wheel; a flow passage being provided over the circumference of the compressor wheel and radially outward therefrom; and a movable vane mechanism,
the movable vane mechanism including: plural movable vanes being provided in the flow passage in such a way that the plural movable vanes are arranged in a circumference direction of the compressor wheel at regular intervals; and shaft portions being provided to the movable vanes respectively, and
the movable vane mechanism varying sizes of spaces between the movable vanes by rotating the plural movable vanes around the shaft portions by using an actuator, wherein
the control apparatus is programmed so as to include control programming instructions that are executed to control an operation of the movable vane mechanism so that the sizes of the spaces are increased when the exhaust gas is led to the compressor via the EGR passage as compared with a case when the exhaust gas is not led to the compressor while the internal combustion engine is operated.

2. The control apparatus according to claim 1, wherein
the control programming instructions are further executed by the control apparatus to control the operation of the movable vane mechanism so that the plural movable vanes are rotated to a position which makes the sizes of the spaces largest within range of positions where a surge of the compressor is avoided, when a temperature of the exhaust gas purifying device is equal to or higher than a predetermined upper limit temperature and the exhaust gas is led to the compressor via the EGR passage.

3. The control apparatus according to claim 1, wherein
a performance of the exhaust gas purifying device is recovered by an elevating temperature operation,
the control apparatus is further programmed so as to include programming instructions that are executed to elevate the temperature of the exhaust gas purifying device up to a target temperature at a moment when the elevating temperature operation is performed, and
the control programming instructions are further executed by the control apparatus to control the operation of the movable vane mechanism so that the plural movable vanes are rotated to a position which makes the sizes of the spaces largest within range of positions where a surge of the compressor is avoided, when the elevating temperature operation is performed by the control apparatus executing the control programming instructions and the exhaust gas is led to the compressor via the EGR passage.

4. A control apparatus applied to an internal combustion engine, the internal combustion engine including:
a turbocharger having a turbine which is provided in an exhaust passage and a compressor which is provided in an intake passage;
an exhaust gas purifying device which is arranged to purify exhaust gas at a section downstream of the turbine in the exhaust passage; and
an EGR passage which connects a section downstream of the exhaust gas purifying device in the exhaust passage and a section upstream of the compressor in the intake passage,
the compressor including: a compressor wheel; a flow passage being provided over the circumference of the compressor wheel and radially outward therefrom; and a movable vane mechanism,
the movable vane mechanism including at least one movable vane which is provided so as to be movable between a projected position where the movable vane is projected into the flow passage and a housed position where the movable vane is housed within a wall surface forming the flow passage by using an actuator, wherein
the control apparatus is programmed so as to include control programming instructions that are executed to control the operation of the movable vane mechanism so that the movable vane is moved to the housed position when the exhaust gas is led to the compressor via the EGR passage.

5. The control apparatus according to claim 4, wherein
the control programming instructions are further executed by the control apparatus to control the operation of the movable vane mechanism so that the movable vane is moved to the housed position when a temperature of the exhaust gas purifying device is equal to or higher than a predetermined upper limit temperature and the exhaust gas is led to the compressor via the EGR passage.

6. The control apparatus according to claim 4, wherein
a performance of the exhaust gas purifying device is recovered by an elevating temperature operation,
the control apparatus is further programmed so as to include programming instructions that are executed to elevate the temperature of the exhaust gas purifying device up to a target temperature at a moment when the elevating temperature operation is performed, and
the control programming instructions are further executed by the control apparatus to control the operation of the movable vane mechanism so that the movable vane is moved to the housed position when the elevating temperature operation is performed by the control apparatus executing the programming instructions and the exhaust gas is led to the compressor via the EGR passage.

* * * * *